Patented Nov. 15, 1932

1,887,586

UNITED STATES PATENT OFFICE

AXEL RUDOLF KONRAD DJURSON AND BERT HENRY BROWALL, OF MALMO, SWEDEN, ASSIGNORS TO SVENSKA AKTIEBOLAGET BROMSREGULATOR, OF MALMO, SWEDEN, A CORPORATION OF SWEDEN

AUTOMATIC SLACK ADJUSTER FOR BRAKES

Application filed October 29, 1928, Serial No. 315,800, and in Germany November 5, 1927.

The present invention refers to an apparatus for automatic adjustment or control of the slack or free space between the brake shoes and the wheels on railway vehicles and the like, and the function of the apparatus is based on the employment of a screw connection for the purpose of diminishing and enlarging the slack by a corresponding variation of the distance between two points in the brake rigging, such variation being effected by a relative rotation of the parts of the screw connection, whereby a rotation in one direction, performed by the intermediary of a clutch acting in both directions of rotation, effects a diminishing of the slack, and a rotation in the opposite direction effects an enlargement of the slack. For the sake of simplicity it may be assumed in the following that the screw connection consists of a fixed screw connected to one of the points, between which the distance is to be varied, and a nut rotatably mounted on said screw and connected with the other of said points. It will, however, be apparent that the result will be the same in case the conditions are reversed.

When using a screw connection as stated above in slack adjusters of the type referred to in this connection for the purpose of diminishing and enlarging the slack, two different instances can occur according to different constructions of the screw spindle. In the first instance the pitch of the screw, may be so low that the screw connection is self-locking, i. e. of such a kind that the nut cannot be caused to rotate due to axial stresses in the spindle only, and in this instance the slack adjuster can be used only for varying the distance between the two points in the brake rigging in a direction for diminishing the slack. This operation corresponds to the compensation required for the wear of the blocks. In the other instance the pitch of the screw may be so high that the screw connection is non-self-locking, i. e. the nut may be caused to rotate due to axial stresses in the spindle only, and in this instance the slack adjuster may be used both for diminishing too large a slack and for enlargement of too small a one.

It has been proposed to use both self-locking and non-self-locking screw spindles, and it has also been proposed to use a positively controlled pawl or locking device in slack adjusters provided with non-self-locking screw spindles for the purpose of locking the nut in a direction against enlargement of the slack, as soon as the stroke of the brake piston has reached a certain value. Finally, it has also been proposed to mount a resilient member in the actuating mechanism for transmitting the reciprocating movement of the brake piston to the nut and for transforming the same into a rotation of the latter in a direction for diminishing the slack, such resilient member being adapted to take up the excess of motion of the actuating mechanism which perhaps may occur after the nut has been locked on account of the stresses arising when braking, so that it cannot be further rotated in said direction.

The characteristic feature of the present invention consists substantially in the fact that the resilient member just described, in slack adjusters wherein such member is constructed in the form of a clutch (or is substituted by a clutch) the members of which may be slid relatively to each other, or which clutch is adapted to be entirely set out of action due to the braking stresses after the locking of the screw connection, is adapted to coact with suitable means constructed so as to effect an engagement of the clutch at a certain moment during the braking movement. The other mechanical features belonging to the apparatus have likewise been simplified and their manner of action considerably improved. This is especially true with regard to the pawl device referred to above and coacting with the transmission means for the adjusting movement from the brake piston to the nut. In earlier constructions of similar kind, such pawl device has been thrown in or out of action by means of the movements of the transmission means referred to above, but according to the present invention the pawl device is permanently in engagement and acts constantly as a driving means in one direction of rotation only.

The invention is illustrated in the accompanying drawings as used in a pull-rod belonging to the brake rigging and adapted for decreasing and for increasing the distance between the ends of said pull-rod.—In the drawings.

The rod (in this instance a pull-rod) in which the slack adjuster is mounted, is supposed to consist of two parts, and one of them, i. e. the part 1, in a suitable manner is rigidly connected with a screw spindle 2, the other part consisting of a tube 3 within which the screw spindle is telescopically displaceable, such tube being connected with a nut 4 surrounding the spindle. The tube 3 is connected to a sleeve-shaped casing enclosing the parts of the mechanism as described below, and at one end such mechanism is provided with a connection eye 5, a similar connection eye being also provided at the opposite end of the rod 1, although not shown in the drawings.

In the embodiment of the invention illustrated in Fig. 1, the casing surrounding the mechanism consists of three parts, i. e. an end piece 6 rigidly connected to the tube-shaped rod part 3 and interiorly provided with an abutment 6a, the purpose of which will be more fully described below; an intermediate part 7 the interior of which forms an abutment 7a facing the abutment 6a, such intermediate part at its opposite end being provided with an annular set of teeth 7b; and a sleeve-shaped extension 8 of the intermediate part 7 such extension forming an abutment flange 9.

In a suitable manner the eye 5 is rigidly connected to a screw 10 provided with a rod-shaped extension 11 extending through the mechanism and provided at its inner end with a fixed flange 12, the circumference of which is positioned between the abutments 6a and 7a described above; a certain amount of play being provided for, the amount of which can be chosen so as to permit the abutments to be axially displaced a certain distance in relation to the flange.

Within the mechanism the rod 11 is surrounded by a comparatively strong expansion spring 13 mounted under some degree of permanent compression, one end of said spring being seated against the flange 12 and the other end, through the intermediary of thrust bearing 14, being seated against a bell-shaped cover 15 forming one member of a preferably conical friction clutch and provided with an abutment 16 for coaction with the abutment flange 9.

The mechanism is further provided with a toothed ring 17 connected with the cover 15 so as to permit an axial displacement in relation thereto, although it is positively brought to rotate at the rotation of said cover. For this purpose the cover 15 may be provided with a sleeve-shaped extension 18 surrounding the ring 17 and with longitudinal grooves 18a coacting with pins 17a or the like extending from said ring and slidably penetrating said grooves. The teeth on the ring 17 and the toothed part 7b are wedge-shaped and provided with axially positioned end faces and with such an inclination of the outer faces that they will positively go into engagement, if the ring 17 is rotated in a direction for screwing on the nut 4 on the spindle 2 for the purpose of shortening the distance between the connection points of the combined rod 1, 3, but when rotating the ring in the opposite direction the teeth will freely slide on each other. A spring 19 is mounted between the ring 17 and an interior abutment on the cover 15 for the purpose of keeping the teeth in permanent engagement, but the strength of this spring is insignificant in comparison with the strength of the main spring 13.

The screw 10 is further provided with a nut 20 connected to a crank lever 21 and formed into a conical clutch member 22 for coaction with the clutch member formed by the cover 15, as described above. In a suitable manner, for instance in a manner known from other slack adjusters, the lever 21 is intended to be connected with a suitable part of the brake rigging in such a manner that it will be given a rocking movement around the screw 10 at the reciprocation of the brake piston. This rocking movement of the lever 21 is to be performed in such a way that it will turn the nut 20 in a direction for throwing in the clutch 15, 22 (on account of the axial displacement of the nut on its screw) at the movement of the brake piston corresponding to an advancing movement of the brake shoes towards the wheels. At the movement of the brake piston in the opposite direction corresponding to a release of the brakes, the nut 20 will naturally be axially displaced in the opposite direction, so that the clutch members will be disengaged.

It is to be observed that the connection between the parts 10 and 20 need not of necessity be carried out in the form of threads, the main condition being that the rotation of the crank lever 21 around the longitudinal axis of the mechanism will cause an axial displacement of the clutch member 22, irrespective of the constructional features of the means used for obtaining this effect. The use of threads instead of, for instance, oblique collars for the purpose of obtaining the axial displacement involves the advantage, however, that the said displacement will take place positively in both directions, and then a driving force acting in inclination to the plane of movement of the crank lever 21 will have no disturbing effect on the axial displacement of the clutch member to be performed.

In order to obtain a clear understanding of the function of the apparatus just described, it will be necessary to take in consideration two different points of time during a braking operation, viz. a first point or moment A, in which the crank lever 21 has been turned so far that the clutch 15, 22 is thrown in, and a second point or moment B, in which the stresses arising in the rod 1, 3 during braking have grown to a value corresponding to the strength of spring 13. Now, it is the sequence or order of these points or moments which determines the function of the apparatus, i. e. whether the point A occurs before or after the point B or whether such points are simultaneous. If the point A occurs before the point B a shortening of the pull-rod 1, 3, and thereby a reduction of the slack will take place, irrespective of whether or not the screw connection is self-locking; if the points A and B occur simultaneously, neither a decrease nor an increase in length of the pull-rod will be effected; and finally if the point B occurs before the point A, this fact will indicate that the slack or free space between the brake shoes and the wheels is too small. This case can only occur when using a self-locking screw connection, and the slack will then continue to be too small, until the brake shoes have been worn so much that said slack has again reached its normal value, whereafter the points A and B will occur simultaneously again. On the contrary, if using a non-self-locking screw connection, the point B cannot occur before the point A, even if the slack should be too small. In such case, if the stress tends to occur in the brake rigging (i. e. also in the pull-rod 1, 3) before the point A, the slack adjuster is not yet locked against lengthening of the rod, and therefore, on account of said stress, a lengthening will take place in correspondence with the movement of the brake piston. Thus, the stress in question cannot arise before the point A is reached and the slack adjuster has been locked against lengthening of the rod. It is to be noted, however, that an intermediate instance can occur, as described below, when using a non-self-locking screw connection, and in such instance the clutch 15, 22 can be engaged before the locking point, so that a rotating movement for reducing the slack will begin before the point A is reached. Also in this instance the locking of the apparatus against lengthening of the rod will take place after a predetermined length of stroke of the brake piston only, and the point A in such apparatus is to be understood as the moment when this locking action takes place. The manner of action of an apparatus constructed in this way will be described later on.

Assuming that the screw 2 is self-locking, normal slack can at first be assumed to be present, i. e. a slack the size of which is not to be changed. The engagement of the clutch 15, 22 takes place when the brake piston has moved a length of stroke corresponding to such normal slack and in this case the shoes will simultaneously be brought into contact with the wheels. If the braking is continued, the brake piston will thereafter move further a smaller or greater amount according to the elasticity of the brake rigging and from other reasons, and thereby a rapidly increasing stress will arise in the pull-rod 1, 3. This being a fact, the spring 13 will be compressed, the abutment $7^a$ comes forcibly in contact with the flange 12 and by friction against the latter it prevents the casing 6, 7, 8 and the nut 4 from rotating. Then the screw connection will be locked, whereafter the apparatus will act as a compact rod having a constant length.

Figure 1:
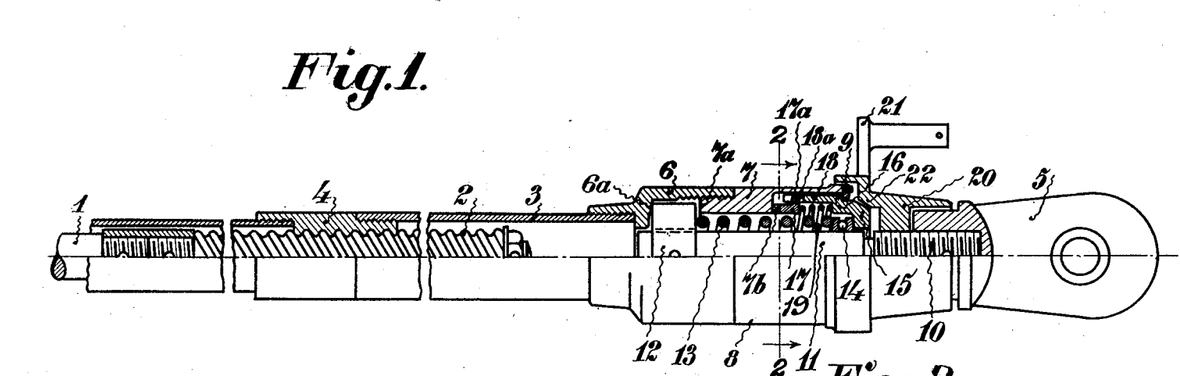
Fig. 1 shows an elevation of the whole apparatus, the upper half of the figure being shown in section.
Figures 1A, 3:
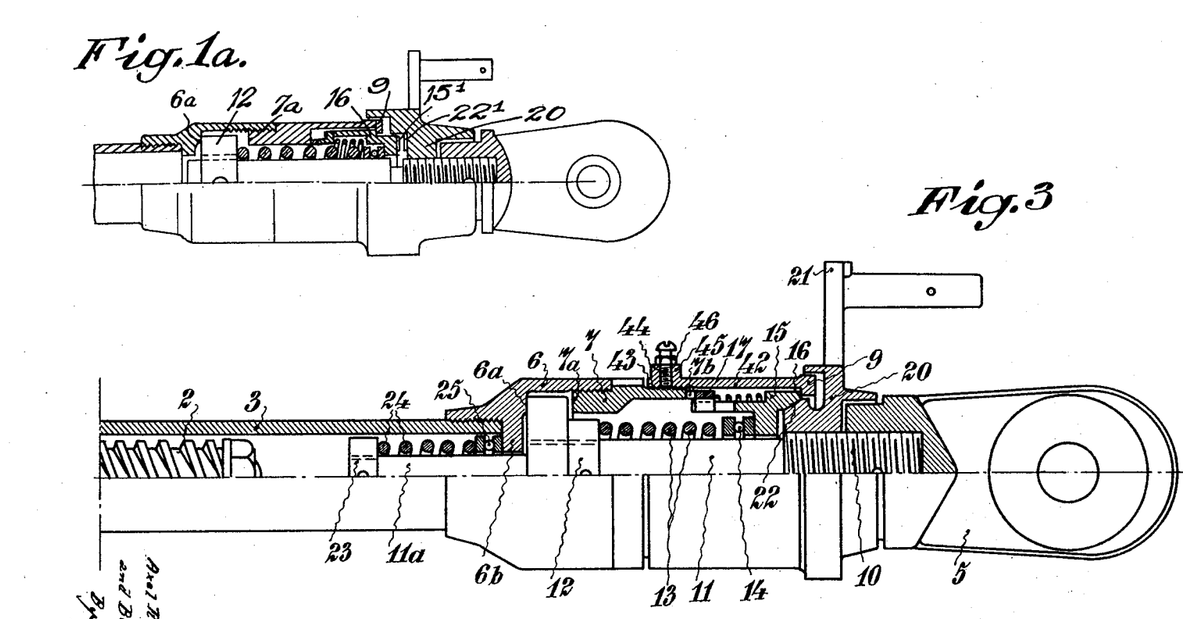
Fig. 1a is a modification showing a different type of clutch than that in Fig. 1.
Fig. 3 shows another modification by means of which the clutch may be disengaged due to the braking stresses.

In order to make it possible for the crank lever 21 to perform the motion effected by the continued travel of the brake piston on account of elasticity in the brake rigging after the locking of the screw connection, the clutch may be made slidable and carried out, for instance, in the form of a conical friction clutch, as shown in Fig. 1. In this instance, the driving power of the clutch is limited to a value corresponding to the limited power of engagement determined by the spring 13, or else the clutch may be non-slidable and arranged so as to be completely disengaged when the braking stress arises, for instance, as illustrated in Fig. 1$a$. In this instance, the clutch $15^1$, $22^1$ is shown in the form of a dog clutch and the space between the abutment $7^a$ and the flange 12 is made so large in relation to the axial displacement of the nut 20 at the engagement of the clutch that when the abutment $7^a$ is drawn over in contact with the flange 12, due to the braking stress, the clutch member $15^1$, by means of the flange 9 acting upon the abutment 16, will be disengaged from the clutch member $22^1$. Hence, in this instance the nut 4 (not shown in Fig. 1$a$) will not be rotated.

If the slack is too large and consequently has to be diminished, the brake shoes will have not come into contact with the wheels when the brake piston has travelled its length of stroke corresponding to normal slack. The result will be, that the clutch 15, 22 will be engaged before any considerable stress has arisen in the pull-rod 1, 3. At the engagement of the clutch it will take over the pressure from the spring 13, which pressure will thus be relieved from the abutment flange 9. Therefore the contact pressure between the flange 12 and the abutment $6^a$ resulting from the pressure of the spring 13 on the abutment flange is relieved, and consequently the friction between these surfaces, which would otherwise form a resistance to the rotation of the nut 4, will be eliminated. By means of the clutch 15, 22 the lever 21 will then cause the rotation of parts 15, 16 and 18, and such rotation, by means of the pawl device 17, $7^b$ acting positively in this direction, will be transmitted to the housing 6, 7, 8, 9 and thus also to the nut 4 which latter will be rotated in relation to the screw spindle 2, so that the length of the combined rod 1, 3 will be reduced, whereby the slack will consequently be diminished. This rotation will continue until the stresses arising in the rod have a locking action on the mechanism in the manner described above.

If the screw 2 is not self-locking, the apparatus may also be used for enlarging the slack, if the same, from one reason or another, should have become too small. If it is assumed, when using such a screw connection, that the slack is too small and has to be enlarged, this result is obtained by the brake shoes coming in contact with the wheels before the clutch 15, 22 has been engaged, as the length of the brake piston stroke corresponding to normal slack has not then been completed. Before the engagement of the clutch a stress will then arise in the rod 1, 3 and as soon as this stress has grown sufficiently for compression of the spring 13, the abutment $6^a$ tends to move away from the flange 12. As soon as this happens the casing 6, 7, 8, 9 of the apparatus will be free, apart from the support from the thrust bearing 14, and if said bearing offers a sufficiently small resistance against the rotation, the tension in the pull-rod 1, 3 by means of the screw 2 will cause a rotation of the nut 4 and the casing, whereby the toothed wheel 17 and the parts 15, 16, 18 will rotate together with the casing. This rotation, which apparently causes a lengthening of the apparatus during the continued movement of the brake piston, will continue until the piston has travelled a length of stroke corresponding to the normal slack, and at this point the clutch 15, 22 is engaged. This being effected, the casing and, hence the nut 4 is checked by the clutch, and the stress at hand in the rod 1, 3, which stress on account of the lengthening performed has not been able to rise above a value corresponding to the pressure of the spring 13, will now be in position to grow higher and to carry the abutment $7^a$ in contact with the flange 12, whereafter the screw connection is locked in the same manner as described above.—Thus it will be seen, that the apparatus has an especially rapid action when the increase of too small slack occurs, and that an increase up to the normal value will be effected by one single approach movement of the brake shoes towards the wheels, irrespective of the difference between the actual value of the slack and the normal value of the same.

By properly determining the amount of play between abutments $6^a$ and $7^a$ and the flange 12 in relation to the amount of axial displacement of the nut 20 at the rotation of the latter, the clutch 15, 22 may be closed before the locking point, as stated above, provided that the screw 2 is not self-locking. Hence, a shortening of the rod 1, 3 and a consequent diminishing of the slack may obviously begin before the brake piston has travelled its length of stroke corresponding to the normal slack and when the locking of the apparatus against elongation takes place, the slack then being nil, i. e. the shoes are advanced towards the wheels. Provided that the clutch is thus engaged beforehand, the diminishing of the slack performed for each braking operation may be multiplied without any risk that too small a slack is obtained. A too great reduction of the slack at a point of time previous to the locking moment will cause an approach of the brake shoes towards the wheels previous to this moment, and the stresses which then arise too early in the pull-rod 1, 3 will cause the clutch member 15, by means of the abutment 9, to be disengaged from the clutch member 22, whereafter a lengthening of the rod and corresponding enlargement of the slack will take place again in the manner described more fully below, so that a compensation for the too great reduction of the slack caused in this instance will be obtained.—Hence, it will be seen that the apparatus, when operated in this manner, will have a very rapid action for the reduction of too great a slack, and the practical result obtained is the possibility of reducing too great a slack to normal value by a few braking operations, or by one single braking in case the difference is not too great.

Assuming in this instance, when the clutch 15, 22 is engaged before the locking point, that the slack has been too small, the clutch member 15 will at once be disengaged from the clutch member 22 on account of the stresses immediately arising in the rod 1, 3 at the approach of the brake shoes towards the wheels, and simultaneously the abutment 6ª will be removed from the flange 12, whereupon the operation of the apparatus will be the same as described above in respect of an increase of too small slacks, until the clutch member 22, its continued rotation and simultaneous axial displacement, approaches the clutch member 15 for repeated engagement. The latter clutch member, on account of contact between the abutment 7ª and the flange 12, can no longer be disengaged by the stresses which have arisen, whereupon a final locking of the apparatus against further lengthening of the rod will take place.

When a locking action of this kind occurs, preventing a further lengthening of the apparatus, for instance after an enlargement of the slack has been effected, the pressure of the spring 13 against the contacting surfaces of the parts 16 and 9 will be eliminated. Such pressure will be taken up by the clutch 15, 22 in the manner described above, so that the contact pressure between the parts 7 and 12 at the abutment 7ª will be increased when stresses arise in the pull-rod 1, 3 (i. e. the contact pressure will be the total amount of the stresses in the pull-rod, instead of such amount minus the pressure of the spring), and thus a better locking action will be obtained. As the distance between the abutment face 7ª and the flange 12 is smaller than the axial movement needed for the final engagement of the clutch 15, 22, the supporting action of the antifriction bearing 14 on the rotatable part 3, 4 of the nut-and-screw connection will be eliminated when the clutch is engaged.

The embodiment described in the foregoing is intended to explain the principle of the invention, and the modifications described below with reference to Figs. 3–7 include additional improvements to the construction first described. In all of Figs. 3–7 corresponding reference numerals are applied to the same or similar parts or features, and the reference numerals not included in Figures 3–7, although applicable thereto, are superfluous for an understanding of the modifications to be described.

The modification shown in Fig. 3 refers to an apparatus of the kind wherein the abutment surfaces 6ª and 7ª are positioned with a little play in relation to the flange 12, so that the clutch 15, 22 may be disengaged by means of the braking stresses. The apparatus may be used in combination with both self-locking and non-self-locking screw connections and in the latter case it may effect both a decrease and an increase of the slack.

The difference in comparison with the embodiment described above resides substantially in the fact that the rod 11 is provided with an extension 11ª projecting into the tube 3 and provided with a fixed end flange 23, a pressure spring 24 being mounted between said flange and a flange 6ᵇ provided on the part 6 of the casing, an anti-friction thrust bearing 25 being interposed between the end of the spring and the last mentioned flange.

The additional parts just described are intended to do away with a difficulty arising when using an apparatus according to Fig. 1 in brake assemblies of the kind wherein an initial stress is at hand even in released condition of the brake. Such initial stress may be caused, for instance, by return springs positioned at the brake shoes and adapted to move them away from the wheels when the release of the brake occurs, so as to avoid the friction otherwise arising. Naturally this initial stress or tension, just in the same manner as the stress arising when braking, will tend to disengage the clutch 15, 22 and thus produce a lengthening of the rod, when using screw connections of a non-self-locking kind. The spring 13 must, of course, be of such a strength that this action cannot take place.

Under this condition, i. e. when an initial stress is at hand, an apparatus according to the embodiment shown in Fig. 1 will act in the following manner:—During a braking operation the clutch member 22 will be rotated and axially displaced towards the flange 12, and as long as no braking stress has arisen, the clutch member 15 takes part in the movements of the clutch member 22. (This function, in an apparatus provided with a non-self-locking screw connection, takes place substantially at each braking, but in apparatus provided with a self-locking screw connection it takes place only when the slack is too large.) The pressure of the spring 13, on account of the engagement of the clutch, is relieved from the abutment flange 9, but the latter will nevertheless be in contact with the abutment 16 under a pressure required to resist the initial stress referred to above. The contact thus causes a certain friction between the clutch members 15, 16 and the abutment flange 9 connected with the nut 4, and consequently the nut tends to follow the rotating movements of the clutch in both directions, as long as the clutch is engaged and the abutment 7ª is not in contact with the flange 12. This tendency causes no disadvantage as long as the clutch is rotated in a direction for diminishing the slack, whereby the casing 9, 8, 7, 6 and the nut 4 are also brought to take part in the rotation by means of the transmission members 17, 18. On the contrary, at the rotation of the clutch in the opposite direction, the casing and the nut must not take part in the movement, and their tendency to do this has to be eliminated in order that the diminishing of the slack once obtained may not be lost again by a corresponding rotation in the opposite direction.

The operation of the modified apparatus according to Fig. 3 is substantially identical with that described in connection with Fig. 1.—The abutment 6ª is in contact with the flange 12 under the pressure of both of the springs 13 and 24, when the clutch is disengaged. When the clutch is brought into engagement, the pressure of the spring 13 is relieved from the flange 12 and, hence, from the abutment 6ª in the manner described above, the abutment 6ª then still resting against the flange 12 under the pressure of the spring 24. The strength of said spring 24 may be substantially the same as that of the spring 13, so that it will be able to resist an initial stress in the brake rigging and, besides, can press the abutment 6ª against the flange 12 so strongly that a certain resistance to the rotation is set up. The clutch 15, 22, if slideable, must then obviously be calculated with so large a driving power that it will overcome the said resistance against rotation when a diminishing of the slack is to be obtained. As long as the clutch is engaged but no braking stress has arisen, the abutment flange 9 can not be brought to rest against the abutment 16 due to the initial stress in the brake rigging, and the tendency of the casing to take part in the rotating movement in both directions is thus eliminated simultaneously, as a positive resistance against an undesired return rotation of the nut and the casing has been introduced.— The disadvantage of the construction according to Fig. 1 in this respect has accordingly been eliminated.

The use of the additional spring 24 involves, however, a certain risk, in case the transmission means 17, 18 or the spring 13 for one reason or another should get out of working order. In the apparatus according to Fig. 1 the clutch 15, 22 and, hence, the abutment 16 also will be displaced in a direction towards the flange 12 when braking, as soon as the abutment 7ª due to the braking stresses is advanced towards the said flange, so that the apparatus is locked against lengthening of the rod. The only consequence would then be that the apparatus ceases to function and acts as a compact rod only. In the apparatus according to Fig. 3, in contradiction thereto, the braking stresses in such an instance would at first compress the spring 24, but when doing this the abutment 6ª is brought out of contact with the flange 12, and the casing will be free to rotate supported by the anti-friction bearing 25 only. Then the result would be a lengthening of the rod as far as permitted by the screw connection 2, 4 (Fig. 1), and therefore the brake piston might perhaps reach its end position without exerting any braking power, i. e. the braking effect would not occur.

Figure 4:
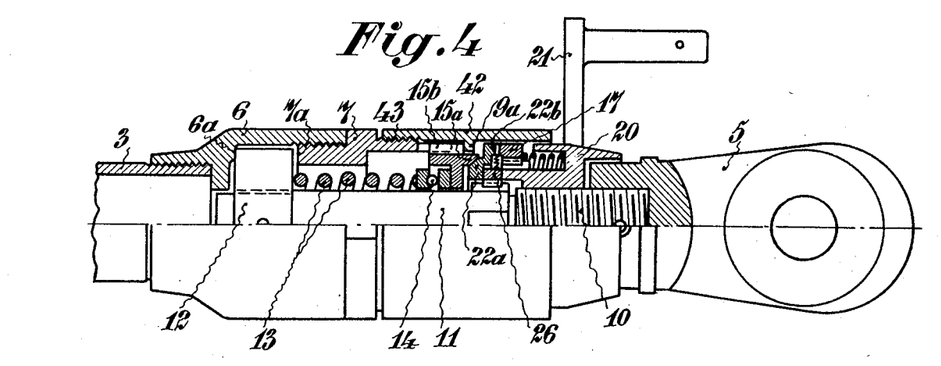
Fig. 4 is a view, partly in elevation and partly in section, showing a third modification.

In order to eliminate this risk, the modification according to Fig. 4 (or Fig. 5) may be used. With regard to the modification shown in Fig. 4 the same is carried out fully in conformity to the description above and provided with a clutch which is engaged from the outset, some differences being at hand, however, as will be described in the following.

The difference in relation to the embodiments of invention described above is to be found in the fact that the clutch member 22ª is not directly connected with the nut 20 but indirectly by the intermediary of the pawl device, and in this instance the spring 24 described in connection with Fig. 3 may be dispensed with.

In the embodiment according to Fig. 4 the pawl device consists of a ring 17 provided with teeth, such ring being axially displaceably but not rotatably mounted on the nut 20, for instance by means of a slot and key connection, and a corresponding toothed ring 22ᵇ on the driving clutch member 22ª, such last mentioned member coacting with a driven clutch member 15ª axially displaceably but not rotatably connected to the casing of the apparatus. This last mentioned interconnection may suitably be carried out by means of cams 15ᵇ on the clutch member 15ª, such cams being slideable in corresponding axial grooves in the casing. Simultaneously said cams may serve as abutments against a resting flange 9ª corresponding to the flange 9 described above and positioned within the casing.—It is also to be noted that a retarding ring 26 is mounted between the nut 20 and the clutch member 22ª, such ring in a suitable manner being axially displaceably but not rotatably connected with the rod 11, for instance by a slot and key connection.

When diminishing or enlarging the slack, the operation will be generally the same as described with reference to Fig. 1. Also in the apparatus according to Fig. 4 it is obvious that the braking stress may freely advance the abutment 7ª against the flange 12 and thus lock the apparatus against an enlargement of the slack, as soon as the clutch, when applying the brakes, has been moved sufficiently far in the direction towards said flange, this function being a fact whether the pawl device 17, 22ᵇ is out of working order or not. Hence, an unlimited enlargement of the slack cannot take place in this apparatus, in case the pawl device does not function.

The retardation of the tendency of the casing to join in the return rotation during the period when the clutch is engaged and no braking stress is at hand, as referred to above, according to this modification is effected by means of the retarding ring 26 in the following manner. The pressure of the spring 13, when the clutch is engaged, is transmitted from the clutch member 15ª by the clutch member 22ª and the retarding ring 26 to the nut 20. The spring pressure will then set up a strong pressure between all of the contacting surfaces of the aforementioned parts, and a certain amount of friction will thus be present during said period between the clutch member 22ᵃ and the retarding ring 26. This friction, on account of the fact that the ring 26 is not rotatable, will give rise to a resistance against a rotation of the clutch member 22ᵃ. When rotating the clutch in a direction for diminishing the slack, the pawl device 17, 22ᵃ has to overcome this resistance, but when the nut 20 and hence the toothed ring 17 are rotated in the opposite direction, the clutch member 22ᵃ is not positively rotated but retarded by said friction, and then, due to the spring 13, it will naturally follow the axial displacement of the nut 20, but it does not take part in the rotation of the latter. Due to the contact between the clutch members 22ᵃ and 15ᵃ, the latter and hence also the casing of the apparatus and the nut 4 (Fig. 1) are prevented from rotating, and therefore the diminishing of the slack obtained is also maintained.

Since the aforesaid resistance against the rotation of the clutch member 22ᵃ in a direction for diminishing the slack, of course, does not serve any useful purpose, the retarding ring 26 may be substituted by a suitable pawl device or the like acting in one direction of rotation only; such means, without any substantial resistance, permitting the rotation of the clutch member 22ᵃ in the direction referred to above but preventing the rotation in the opposite direction. The advantage of the means shown and described is, however, the simplicity of construction.

In the last embodiment described above the axial displacement of the clutch member 22ᵃ, due to the pawl device interposed, will not be positively controlled at the disengagement of the clutch, and under such conditions it may happen that the clutch "grips", so that it will not be disengaged when required.

Figure 5:
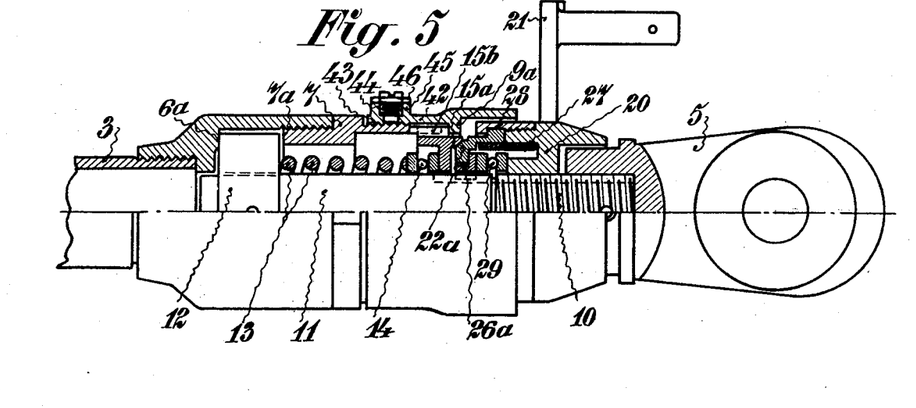
Fig. 5 is a view of like character showing a fourth modification.

In order to do away with this drawback and to obtain a positively controlled axial displacement of the driving clutch member in both directions, the modification according to Fig. 5 may be used, said figure also showing a somewhat different construction of the pawl device, or rather an equivalent therefor, not requiring any axial displacement of the coacting parts.

On comparison of Fig. 4, it will be understood that the rotatable nut 20 must rotate in relation to the non-rotatable retarding ring 26, and the axial pressure between the contacting surfaces will set up a certain resistance to the rotation, said resistance being avoidable by the use of suitable means.—A construction for such purpose is also included in the embodiment shown in Fig. 5.

According to Fig. 5 the nut 20 is connected to the clutch member 22ᵃ by the intermediary of driving means acting in one direction of rotation only and replacing the pawl device described above, said driving means consisting of a helical spring 27 snugly fitting within cylindrical bores in the members to be coupled together. This spring acts in such a manner that, when subjected to torsion in a direction against the separate turns therein, it will expand and increase its diameter whereby a driving connection is established between the cylindrical bores by means of the spring, so that a rotation can be transmitted from one to the other of the members thus coupled together. If the spring is subjected to torsion in the opposite direction, the diameter of the same is decreased, and the driving engagement between the spring and the cylindrical bores is released.—Springs of this kind are already known, and it is not material to the invention whether the driving means acting in one direction is constructed in one way or another.—The embodiment just described has the advantage that the driving action is transmitted without any substantial dead motion.

The positive control of the clutch member 22ᵃ at the engagement of the clutch is obtained by means of the axial displacement of the nut 20 in the same manner as described above, but the positive control at the disengagement of the clutch is obtained by means of a sleeve-shaped extension 28 of the nut 20, such extension being provided with a collar engaging the edge of the clutch member 22ᵃ in a manner easily understood from the drawings without further explanation. In this instance the clutch must thus be positively disengaged, even if it has "gripped".

According to Fig. 5 the retarding ring 26ᵃ is given a somewhat different cross sectional shape in comparison with the ring 26 in Fig. 4, but the operation is exactly the same as described with reference to the latter. A ball bearing 29 is interposed between the retarding ring 26ᵃ and the nut 20 for eliminating the friction therebetween in a self-evident manner.

The operation of the apparatus according to Fig. 5 is the same as described with reference to Figs. 3 and 4.

All of the embodiments described above involve the disadvantage that the pressure of the spring 13, during the whole period of engagement of the clutch, will be taken up by the means (the threads between the nut 20 and the screw 10) which causes the axial displacement of the clutch for engagement of the same. Especially in apparatus adapted also for enlargement of too small slack and wherein the clutch is to be engaged previous to the moment of locking the apparatus against further enlargement of the slack, this circumstance will cause the disadvantage that the crank lever 21 is not so easily rockable, and it will form a resistance to the movement when releasing the brake.—In the kind of apparatus just referred to, an improvement in this respect can be obtained by using the modification shown in Fig. 6, and thereby the advantage is also gained that only one single antifriction bearing is required.

Figure 6:
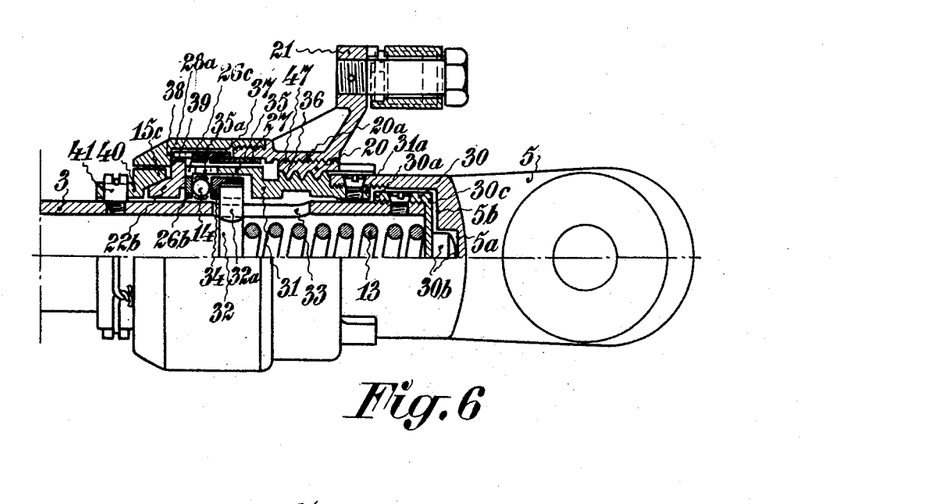
Fig. 6 shows an embodiment provided with means for effecting a manual adjustment of the slack.

According to this modification the apparatus is constructed as follows:—The rotatable rod part 3, which is supposed to consist of a tube, as described above, extends through the mechanism entirely to the connection eye 5. A collar 30 is affixed at the end of the tube, such collar also forming a closure cap $30^c$ so as to form at the same time a resting surface for the spring 13 which is mounted within the tube 3. The connection eye 5 is combined with a sleeve 31 surrounding the tube 3, such sleeve being provided with an abutment $31^a$ for coaction with a corresponding abutment surface $30^a$ on the collar 30 for the purpose of taking up the braking stress. Said collar may also be provided with a pin $30^b$ penetrating into a recess $5^a$ in the eye 5. This pin is adapted for guiding the tube in relation to the connection eye, and the end face of the pin $30^b$ may be adapted for coaction with the bottom of the recess $5^a$ for limiting the movement of the tube 3 in this direction.

The spring 13 is mounted under compression between the cap-forming part $30^c$ of the collar 30 and a washer 32 provided with pins $32^a$ extending through longitudinal slots 33 in the tube 3. By means of a ring 34, a ball bearing 14 and a retarding ring $26^b$ the pins $32^a$ rest against the driving clutch member $22^b$. It may be advisable to construct the ring 34 in such a manner that the pins $32^a$ are seated in recesses in the same in order to prevent a relative rotation. The retarding ring $26^b$ is axially displaceably but not rotatably mounted, in the same way as the corresponding rings 26 and $26^a$ in the embodiments described above, and for such purpose it is suitably guided by a cylindrical extension 35 of the sleeve 31, whereby this extension and the retarding ring may be provided with coacting slots and pins $26^c$ and $35^a$ respectively. The ring 34 and the ball bearing 14 may, of course, be substituted by other constructions of antifriction thrust bearings.

At the exterior the sleeve 31 is provided with threads 36 coacting with a nut 20 corresponding to the nut described above. In the embodiment last described the crank lever 21 is not combined directly with the nut 20 but with a sleeve $20^a$ surrounding the same. The object of this arrangement will be stated later on, but for an understanding of the operation of the apparatus it may be assumed that the nut 20 and the sleeve $20^a$ act as if constructed in one piece.

A driving means acting in one direction of rotation only is interposed between the sleeve $20^a$ and the clutch member $22^b$, such driving means being supposed to be carried out in the form of a torsion spring 27, in the same manner as described with reference to Fig. 5, and a ring 37 coacting with the clutch member $22^b$, said ring being axially displaceable but not rotatable in relation to the clutch member. The sleeve $20^a$ is further provided with an abutment flange 38 positioned for coaction with a corresponding abutment 39 on the clutch member $22^b$ in a manner to limit the axial displacement of said clutch member in the direction of the spring pressure transmitted through the ring 34, the ball bearing 14 and the retarding ring $26^a$.

Finally, the driven clutch member 40 is affixed to the tube 3, for instance by means of screws 41.

In order specifically to understand the manner of action of this modification, it is first to be assumed that the collar 30 is mounted between the eye 5 and the abutment surface $31^a$ of the sleeve 31 in such a manner that it has substantially no play in axial direction. Therefore it must also be assumed that the pin $30^b$ does not reach the bottom of the recess $5^a$, but that the end face $30^c$ of the collar coacts with the inner end face $5^b$ of the eye 5. When the lever 21 is in a position corresponding to released brake, the nut 20 and its sleeve $20^a$ are screwed so far against the eye that the clutch member $22^b$, by means of the contact surfaces 38, 39, is prevented from coming into engagement with the driven clutch member 40. The pressure of the spring 13 on the clutch member $22^b$ is supported by the abutment flange 38 and is transmitted from the latter by the intermediary of the sleeve $20^a$ and the nut 20 to the threads 36 on the sleeve 31. The pressure of the spring 13 on the collar 30 tends to slide the tube 3 and the said collar against the eye 5, whereby the end face $30^c$ of the collar is brought in contact with the end face $5^b$ of said eye, so that the friction then arising between the two surfaces concerned prevents the tube 3 from rotating.

During the application of the brake the lever 21 is rotated, and thereby the nut 20, the sleeve $20^a$ and its abutment 38 are also rotated in such a manner that all of these parts are moved away from the eye 5, whereby the clutch member $22^b$, the abutment 39 of which by means of the spring 13 is pressed towards the abutment flange 38, will be advanced towards the clutch member 40 and finally come into engagement with the latter. On account of its contact with the clutch member 40, the clutch member $22^b$ cannot now be moved away any further from the eye 5, and on the continued rotation of the lever 21 and the axial displacement of the nut 20 and of the sleeve $20^a$ and the abutment flange 38 caused thereby, the said flange must obviously be moved away from the abutment 39. Now, the ring 37 is obviously also axially displaced in relation to the clutch member $22^b$, this being the reason too that said parts have been given a certain amount of free axial play in relation to each other, as described above.

As soon as the abutment flange 38 is moved away from the abutment 39, the pressure of the spring 13 acting upon the clutch member 22$^b$ will be transmitted to the clutch member 40, whereby the clutch is kept in engagement. As the clutch member 40 is rigidly connected with the tube 3, the pressure caused by the spring 13 by means of the collar 30 on the tube 3 is now opposed by an equally large pressure in the opposite direction (the power of the spring 13 is bound within the tube), so that the contact between the surfaces 30$^c$ and 5$^b$ and therefore, the resistance opposing the rotation of the tube are relieved. If the braking stress has not yet arisen at the moment of engagement of the clutch, i. e. if the slack is too great, the rotating movement of the lever 21, which by means of the driving means 27, 37 is transmitted to the clutch member 22$^b$ in a direction for diminishing the slack, by means of the clutch is transmitted to the tube 3 and the nut 4 (Fig. 1), whereby the slack is adjusted. The rotation of the tube 3 is continued until the braking stress carries the abutment face 30$^a$ tightly in contact with the abutment 31$^a$, whereby the tube 3 is locked against a further rotation. For taking up the continued movement of the lever 21, in correspondence to elasticity in the brake rigging etc., the clutch 22$^b$, 40 is preferably made slidable.

If a braking stress arises before the moment of engagement of the clutch, i. e. in case the slack is too small, an enlargement of the slack can take place in the same manner as described above, provided that the screw connection (2, 4 in Fig. 1) is not self-locking. In this instance the braking stress will at first increase so much that the pressure of the spring 13 is overcome and the contact between the surfaces 30$^c$ and 5$^b$ is eliminated, whereafter the tube 3, the collar 30, the spring 13, the washer 32 with its pins 32$^a$ and the ring 34 will freely rotate on the ball bearing 14. The clutch member 40 will, of course, also take part in the rotation which is continued until the clutch member 22$^b$ comes into engagement with the clutch member 40 and prevents further rotation.

In the embodiment just described it will be apparent from the foregoing that the means (the threads 36) causing the control of the clutch is not acted upon by the pressure of the spring 13 during the period of time when the clutch is engaged, but that such pressure will come into action on said means as soon as the clutch is disengaged. When applying this modification on slack adjusters which are also adapted for enlarging too small a slack, and wherein the clutch may be engaged before the locking against an enlargement of the slack occurs, as described in connection with the embodiments above, it will be obvious that the means controlling the clutch are normally not acted upon by the pressure of the spring, and that such pressure on the controlling means occurs only during such a period of a braking operation in which an enlargement of too small slack takes place.

In order to obtain this result by means of the apparatus shown in Fig. 6, it is only to be assumed that the screw connection (2, 4 in Fig. 1) is not self-locking, and that the collar 30 is given a certain amount of axial play corresponding to the axial displacement of the nut 20 at the engagement of the clutch. In this instance the free movement of the collar 30 in a direction towards the eye 5 is suitably limited in such a manner that the end of the pin 30$^b$ comes into contact with the bottom of the recess 5$^b$. The end face of the pin 30$^b$ may preferably be convex, so that no greater amount of friction is caused at the said contact.—The object of this construction is described in the following.

In the position of the lever 21 corresponding to released brake, the nut 20 is supposed to be in such a position in relation to the eye 5 that the spring 13 may be able to push the collar 30 and the tube 3 towards said eye until the clutch member 40 is in contact with the clutch member 22$^b$ before the end of the pin 30$^b$ has reached the bottom of the recess 5$^a$. The clutch 22$^b$, 40 will thus be engaged, and the pressure of the spring 13 is bound within the tube 3. The abutment 39 is in contact with the flange 38 only with that amount of pressure which is present due to initial stress in the brake rigging, this stress being thus the only power now acting upon the threads 36.

The operation is exactly the same as described above in connection with the corresponding modifications, and the diminishing of the slack begins as soon as the lever 21 begins to be rotated. A braking stress arising too early will therefore pull the clutch member 40 out of engagement with the clutch member 22$^b$, and the mechanism will be free to lengthen the pull-rod 1, 3 in the manner described above, until the flange 38 and the clutch member 22$^b$ have been displaced so far away from the eye 5 that a disengagement of the clutch can no longer be effected due to the contact between the surfaces 30$^a$ and 31$^a$. The retarding ring 26$^b$ acts in the same way to prevent lengthening of the pull-rod at the release of the brake, as described in connection with Figs. 4 and 5, the only difference being that said ring is in contact with the clutch member 22$^b$ under the total pressure of the spring 13 also when the clutch is disengaged, and therefore its retarding action will be the better.—Also in this embodiment the retarding ring may be substituted by a pawl device acting in one direction of rotation only.

The object of the arrangement of the pin 30$^b$ is as follows:—When adjusting the brake, for instance in a machine shop, it may sometimes be desired to manually operate the slack adjuster in one direction or the other. The clutch being in permanent engagement, a rotation of the parts offers a considerable resistance, i. e. both in the direction of lengthening the rod, when the resistance is equal to the whole driving power of the clutch, and in a direction for shortening the rod, when it is equal to the arresting power of the ring 26$^b$, such power being transmitted to the tube 3 by means of the engaged clutch 22$^b$, 40. In order nevertheless to make it possible to perform the adjustment desired, the lever 21 may be disconnected from the members (not shown) which cause its rocking movement during braking, whereafter the lever may be turned back so that the nut 20 is advanced towards the eye 5. The abutment flange 38 taking part in this rotation will then also advance the clutch member 22$^b$ towards the eye 5 by means of the abutment 39, and this movement is transmitted to the collar 30 by means of the parts 26$^b$, 14, 34, 32$^a$, 32 and the spring 13. When the displacement has advanced so far that the collar 30 cannot be displaced further in the direction towards the eye 5 on account of the fact that the pin 30$^b$ strikes the bottom of the recess 5$^a$, a continued return rotation of the lever 21 will cause a compression of the spring 13 and therefore also a disengagement of the clutch. As the ring 34 taking part in the rotation of the tube 3 rests against the ball bearing 14, the tube 3 may thereafter be freely rotated under counteraction of the small resistance caused by the contact between the pin 30$^b$ and the bottom of the recess 5$^a$ only. When either or both of the contacting surfaces of the pin 30$^b$ and the bottom of the recess 5$^a$ are spherical, they will form a simple anti-friction bearing which is sufficient for the purpose, although any other type of anti-friction thrust bearing may, of course, be used.—After the manual adjustment referred to, the lever 21 is again turned into its normal position and connected with the driving mechanism, and then the clutch 22$^b$, 40 will obviously be engaged again.

In connection with the description of the embodiments according to Figs. 1–5, it has been shown that the clutch, when using a self-locking screw connection (2, 4 in Fig. 1), may be arranged in such a way that the same will be disengaged by means of the stress arising during braking, and consequently it may also be constructed so as not to be slideable. By means of a simple modification this effect may also be obtained in the modification according to Fig. 6, when using a non-self-locking screw connection, and for instance in the manner illustrated in Fig. 7. In this latter modification the cylindrical extension 35 of the sleeve 31 is provided with an abutment flange 35$^b$ coacting with an abutment surface 34$^a$ on the ring 34. The distance between the abutment flange 35$^b$ and the surface 34$^a$ is less than the distance between the surfaces 30$^a$ and 31$^a$.

Figure 7:
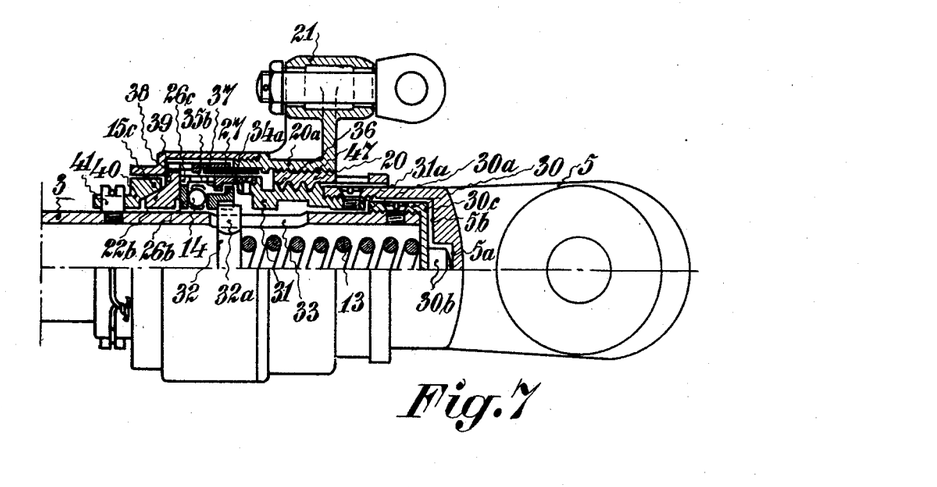
Fig. 7 shows a modification of Fig. 6.

The operation is still substantially the same as described above in connection with Fig. 6, but a slight difference is present as will be described in the following.—Assuming that the slack is too small when effecting braking, the braking stress then arising too early will compress the spring 13 and pull the clutch member 40 out of engagement with the clutch member 22$^b$ in the same manner as before, the last-mentioned clutch member 22$^b$ with its abutment 39 being in contact with the abutment flange 38, and the tube 3 will then be free to rotate on the ball bearing 14 as described above. The rotation of the tube 3 will continue until the abutment flange 38 has been moved so far away from the eye 5 that the surface 34$^a$ is brought in contact with the abutment flange 35$^b$. On account of the resistance then caused by this contact, the rotation of the tube 3 will be prevented, and the braking stress will increase and further compress the spring 13 so much that the collar 30 is carried past the remaining play between the surfaces 30$^a$ and 31$^a$, and these surfaces are brought into tight contact with each other. Now, the tube 3 is locked against further rotation, and by the last mentioned axial displacement of the same the clutch member 40 has also been disengaged from the clutch member 22$^b$, so that the spring 13, by means of the abutment flange 35$^b$, is simultaneously prevented from transmitting any pressure to the ball bearing 14, the retarding ring 26$^b$ and the clutch member 22$^b$. Thus, neither the clutch nor the retarding ring in this position will oppose any resistance to the rotating movement of the sleeve 20$^a$ and the lever 21, and therefore no power must be taken off from the brake for this purpose.

In order to obtain a stronger locking action against the rotation of the tube 3, the surface 34$^a$ and the flange 35$^b$, as well as the surfaces 30$^a$ and 31$^a$, may be given a conical shape or be corrugated or the like.

With regard to the modifications shown in Figs. 6 and 7, it is to be noted that since the pressure of the spring 13, when the clutch is disengaged, is acting upon the means (the threads 36) controlling the clutch in the direction of engagement of the same, the said means are subjected to the influence of forces always acting in the same direction, and on account thereof they need not necessarily be constructed in the form of members positively controlling the movement in both directions, such as threads and the like, and the same operation may be obtained also by means of oblique collars and the like tending to push the sleeve 20ª in a direction towards the eye 5 at the release of the brake and the movement of the lever 21 corresponding thereto.

To make it possible to use all of the embodiments of the invention described above in combination with different brake assemblies wherein the moment of engagement of the clutch and the locking against enlargement of the slack is to be varied, the apparatus must be provided with means for adjusting said moment so that it will occur in correct relation to the stroke of the brake piston, i. e. when such piston has travelled a length of stroke corresponding to the normal slack. Means for obtaining this effect are shown in Figs. 3-7, and their manner of action in all cases is dependent on a displacement of the abutment flange 9, 9ª or 38 respectfully. In the modifications according to Figs. 3-5, the sleeve-shaped extension of one of the casing parts (7 in Fig. 1) which is provided with an abutment flange (9 in Fig. 1) is constructed in the form of a separate sleeve-shaped part 42 connected with the part 7 of the casing by means of threads at 43. By a rotation of the sleeve 42 on the threads 43, the abutment flange 9 or 9ª may obviously be advanced toward or removed from the clutch member 22 or 22ª respectively, and hence an engagement of the clutch and consequently a locking against enlargement of the slack will be obtained sooner or later according to the adjustment made. After the adjustment has been effected, the sleeve 42 has to be locked, so that it cannot be rotated on the threads 43. This effect may be obtained in a known manner, for instance by a set screw 44 as shown in Figs. 3 and 5, such set screw being threaded into a lug 45 on the sleeve 42 and locked by means of a lock nut 46.

In the modifications according to Figs. 6 and 7, the nut 20 and the sleeve 20ª are constructed in the form of separate parts, as described above. By a rotation of the nut 20 in relation to the sleeve 20ª the position of the nut on the threads 36 may be varied in axial direction, such variation also causing a variation of the axial position of the sleeve 20ª and the abutment flange 38 fixed thereto, and therefore the moment of engagement of the clutch and of the locking may be varied. The nut 20 and the sleeve 20ª may be interconnected by means of threads at 47, and hence the axial displacement of the sleeve 20ª for a certain amount of rotation of the nut 20 will correspond to the difference between or the sum of the pitch of the threads 36 and 47, depending on whether said threads run the same way or in opposition to each other. After the adjustment has been effected, the sleeve 20ª and the nut 20 are locked together, for instance by means of a set screw as described above, so that they cannot be rotated in relation to each other.

Figures 2, 8:
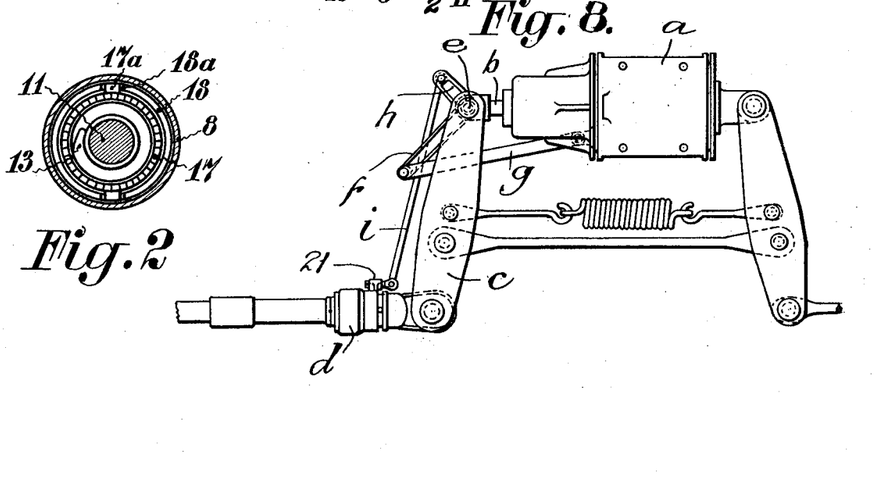
Fig. 2 is a cross section along the line 2—2 in Fig. 1.
Fig. 8 shows the apparatus mounted in operating position.

In Fig. 8 I show the mounting of an apparatus constructed in accordance with Figs. 1 to 7 in operative position. In this figure, $a$ indicates the brake cylinder and $b$ the piston rod; $c$ is the piston rod brake lever and $d$ indicates a slack adjuster constructed in accordance with one of my modified forms, which latter is adapted to be actuated by the crank 21 as clearly set forth heretofore. The piston rod head bolt $e$ carries a bell-crank lever, one arm $f$ of which, by means of a link $g$ is connected with a fixed point on the car frame, while the other arm $h$ of the bell-crank lever is connected, by means of a link $i$, with the crank member 21. When the piston rod $b$ moves to the left to carry out the braking operation, the bell-crank lever $f$—$h$ will turn about the bolt $e$ and by means of the link $i$ will cause a tilting movement in one direction of the crank 21; and when the piston rod moves back again, because of the reverse movement of the parts, the crank member 21 will be tilted in the opposite direction, thus operating the adjuster as set forth above.

What we claim and desire to secure by Letters Patent is:—

1. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster; transmission means combined with the brake structure and adapted to rotate said rotatable member during the reciprocation of the brake piston; a releasable clutch positioned between the rotatable part of the nut-and-screw connection and the rotatable member forming part of the slack adjuster, said clutch acting in both directions of rotation; and means coacting with said clutch for effecting engagement of the same at a certain point in the braking movement.

2. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to perform an oscillatory rotary movement in correspondence with the reciprocation of the brake piston; a releasable clutch acting in both directions of rotation and positioned between the rotatable part of the nut-and-screw connection and the oscillatory member forming part of the slack adjuster; means coacting with said clutch for effecting engagement of the same at a certain point in the braking movement; and a permanently-engaged driving means coacting with the clutch and interposed between the said rotatable part of the nut-and-screw connection and the said oscillatory member, said driving means acting in one direction of rotation only.

3. An automatic slack adjuster according to claim 2, in which means is additionally provided for preventing the rotation of the rotatable part of the nut-and-screw connection in a direction opposite to that caused by the driving means.

4. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to perform an oscillatory rotary movement in correspondence with the reciprocation of the brake piston; a releasable clutch acting in both directions of rotation and positioned between the rotatable part of the nut-and-screw connection and the oscillatory member forming part of the slack adjuster; means coacting with said clutch for effecting engagement of the same at a certain point in the braking movement; a permanetly-engaged unidirectional driving means interposed between the said rotatable part of the nut-and-screw connection and the said oscillatory member; and means acting on the last-mentioned rotatable part through the intermediary of the clutch for preventing the rotation of said rotatable member in a direction opposite to that caused by the driving means.

5. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to perform an oscillatory rotary movement during the reciprocation of the brake piston; a releasable clutch acting in both directions of rotation and mounted between the rotatable part of the nut-and-screw connection and the rotatable member forming part of the slack adjuster; means coacting with said clutch for effecting engagement of the same at a certain point in the braking movement; and a resilient member coacting with the clutch and adapted to limit the transmission power of the same to a maximum value determined by the resilience of said member.

6. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to perform an oscillatory rotary movement during the reciprocation of the brake piston; a releasable clutch acting in both directions of rotation and mounted between the rotatable part of the nut-and-screw connection and the rotatable member forming part of the slack adjuster; means coacting with said clutch for effecting engagement of the same at a certain point in the braking movement; a permanently-engaged, unidirectional driving means interposed between the said rotatable member forming part of the slack adjuster and the said rotatable part of the nut-and-screw connection; means for preventing the rotation of the said rotatable part in a direction opposite to that caused by the driving means; and a resilient member coacting with the clutch and adapted to limit the transmission power of the same to a maximum value determined by the resilience of said member.

7. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to perform a rotary movement during the reciprocation of the brake piston; a slidable and releasable friction clutch mounted between the rotable part of the nut-and-screw connection and the rotatable member forming part of the slack adjuster; means coacting with said friction clutch for effecting engagement of the same at a certain point in the braking movement; and a resilient member coacting with the friction clutch and adapted to limit the transmission power of the same when engaged to a maximum value determined by the resilience of said member.

8. An automatic slack adjuster according to claim 7, which additionally includes a permanently-engaged unidirectional driving means interposed between the rotatable part of the nut-and-screw connection and the rotatable member forming part of the slack adjuster; and means for preventing the rotation of the said rotatable part of the nut-and-screw connection in a direction opposite to that caused by the driving means.

9. In an automatic slack adjuster for brakes on railway vehicles and the like, a rod mounted in the brake rigging and comprising two parts having a nut-and-screw connection betwen them, one part of which connection is rotatable in relation to the other; a rotatable member forming part of the slack adjuster and adapted to rotate during the reciprocation of the brake piston; a releasable clutch acting in both directions of rotation and positioned between the rotatable part of the nut-and-screw connection and the rotatable member forming part of the slack adjuster; means for effecting engagement and release of the clutch by an axial inter-displacement of its members; means co-acting with the clutch for effecting engagement of the same at a certain point in the braking movement; a resilient member coacting with the rotatable part of the nut-and-screw connection and with the clutch, said resilient member being exposed to the initial braking stress arising in the rod during braking, and adapted to yield under such stress and thereby permit the axial inter-displacement of the clutch members for disengagement of the clutch.

10. An automatic slack adjuster according to claim 9, in which both members of the clutch are axially displaceable; and in which the engagement of the clutch is effected by an axial displacement of the clutch member not coacting with the resilient member, said clutch member being the driving one.

11. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to rotate during the reciprocation of the brake piston; a clutch acting in both directions of rotation and positioned between the rotatable part of the nut-and-screw connection and the rotatable member forming part of the slack adjuster; means for effecting axial inter-displacement of the clutch members to engage and disengage the clutch; means coacting with said clutch for effecting the engagement of the same at a certain point in the braking movement; and means for positively controlling the axial inter-displacement of the clutch members both at the engagement and at the disengagement of the clutch.

12. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to rotate during the reciprocation of the brake piston; a driving and a driven clutch member conjointly forming a releasable clutch acting in both directions of rotation and positioned betwen the rotatable part of the nut-and-screw connection and the rotatable member forming part of the slack adjuster; means for connecting the driving clutch member with said rotatable member; resilient means interposed between the driven clutch member and the rotatable part of the nut-and-screw connection; permanently-engaged, unidirectional driving means between the said rotatable part of the nut-and-screw connection and the said rotatable member forming part of the slack adjusted; and means for preventing rotation of said rotatable part in a direction opposite to that caused by said driving means.

13. In an automatic slack adjuster for brakes on railway vehicles and the like, a rod mounted in the brake rigging and comprising two parts having a nut-and-screw connection between them, one part of which connection is rotatable in relation to the other; a rotatable member forming part of the slack adjuster and adapted to rotate during the reciprocation of the brake piston; a releasable clutch acting in both directions of rotation and positioned between the rotatable part of the nut-and-screw connection and the rotatable member forming part of the slack adjuster; means coacting with the clutch for effecting engagement of the same by an axial inter-displacement of its members at a certain point in the braking movement; and means for controlling the axial distance between the clutch members for the purpose of varying such point.

14. An automatic slack adjuster according to claim 13, which additionally includes resilient means coacting with the clutch for limiting the transmission power of the same to a maximum value determined by the resilience of said member.

15. In an automatic slack adjuster for brakes on railway vehicles and the like, a rod mounted in the brake rigging and comprising two parts having a nut-and-screw connection between them, the screw having so large a pitch that the connection is non-self-locking, one of the parts of said nut-and-screw connection being rotatable in relation to the other; a member forming part of the slack adjuster and adapted to perform an oscillatory rotary movement in correspondence with the reciprocation of the brake piston; a releasable clutch acting in both directions of rotation and positioned between the rotatable part of the nut-and-screw connection and the oscillatory member; means coacting with said clutch for effecting an engagement of the same at a certain point in the braking movement; a permanently-engaged, unidirectional driving means interposed between the said rotatable part of the nut-and-screw connection and the said oscillatory member; and an antifriction thrust bearing coacting with the rotatable part of the nut-and-screw connection and adapted to take up the braking stress arising when an increase of the slack has to take place.

16. An automatic slack adjuster according to claim 15, which additionally includes means for eliminating the relieving action of the antifriction thrust bearing on the rotatable part of the nut-and-screw connection when the clutch is engaged, and a fixed abutment adapted to take up the braking stress previously acting on the thrust bearing but relieved therefrom; said abutment being constructed to prevent further rotation of the said rotatable part in a direction to increase the slack.

17. In an automatic slack adjuster for brakes on railway vehicles and the like, a rod mounted in the brake rigging and comprising two parts having a nut-and-screw connection between them, the screw having so large a pitch that the connection is non-self-locking, one part of said nut-and-screw connection being rotatable in relation to the other; a member forming part of the slack adjuster and adapted to perform an oscillatory rotary movement in correspondence with the reciprocation of the brake piston; a releasable clutch acting in both directions of rotation and positioned between the rotating part of the nut-and-screw connection and the oscillatory member forming part of the slack adjuster; means coacting with said clutch for effecting an engagement of the same at a certain point in the braking movement; an antifriction thrust bearing coacting with the rotatable part of the nut-and-screw connection and adapted to take up the braking stress arising when an increase of the slack has to take place; means for eliminating the relieving action of the antifriction thrust bearing on the rotatable part of the nut-and-screw connection when the engagement of the clutch takes place; a fixed abutment located a slight distance from said rotatable part and adapted to take up the braking stress previously acting on the thrust bearing but relieved therefrom, said abutment being constructed to prevent further rotation of the rotatable part of the nut-and-screw connection when engaged, and the distance between the fixed abutment and the rotatable part of the nut-and-screw connection being so dimensioned in relation to the movement of engagement of the clutch that the clutch members may be released by the braking stress before the moment at which the rotatable part of the screw connection is prevented from further rotation in a direction for increasing the slack by engagement with the fixed abutment.

18. In an automatic slack adjuster for brakes on railway vehicles and the like, a rod mounted in the brake rigging and comprising two parts having a nut-and-screw connection between them, one of which parts is rotatable in relation to the other; a rotatable member forming part of the slack adjuster and adapted to rotate during the reciprocation of the brake piston; a releasable clutch acting in both directions of rotation and positioned between the rotatable part of the nut-and-screw connection and the rotatable member forming part of the slack adjuster; means coacting with said clutch for effecting an automatic engagement of the same at a certain point in the braking movement; and means for effecting manual disengagement of the clutch when the brake is released.

19. An automatic slack adjuster according to claim 18, which additionally includes an antifriction bearing coacting with the rotatable part of the nut-and-screw connection to permit easy rotation of the same when the clutch is manually disengaged.

In testimony whereof we have signed our names to this specification.

AXEL RUDOLF KONRAD DJURSON.
BERT HENRY BROWALL.